United States Patent
Zens et al.

(10) Patent No.: US 11,988,298 B2
(45) Date of Patent: May 21, 2024

(54) DEVICE FOR CONTROLLING A FLOW RATE AND EXPANDING A FLUID IN A FLUID CIRCUIT

(71) Applicant: Hanon Systems, Daejeon (KR)

(72) Inventors: Daniel Zens, Kreuzau (DE); Uwe Poschenrieder, Bornheim (DE); Dirk Salewski, Jülich (DE)

(73) Assignee: HANON SYSTEMS, Daejeon (KR)

( * ) Notice: Subject to any disclaimer, the term of this patent is extended or adjusted under 35 U.S.C. 154(b) by 5 days.

(21) Appl. No.: 17/457,981

(22) Filed: Dec. 7, 2021

(65) Prior Publication Data

US 2022/0196158 A1    Jun. 23, 2022

(30) Foreign Application Priority Data

Dec. 22, 2020  (DE) ...................... 10 2020 134 622.0

(51) Int. Cl.
  *F16K 3/24*   (2006.01)
  *F16K 31/04*  (2006.01)
  *F25B 41/35*  (2021.01)

(52) U.S. Cl.
  CPC .............. *F16K 3/243* (2013.01); *F16K 3/246* (2013.01); *F16K 31/04* (2013.01); *F25B 41/35* (2021.01)

(58) Field of Classification Search
  CPC .......... F16K 3/243; F16K 3/246; F16K 31/04; F25B 41/35
  See application file for complete search history.

(56) References Cited

U.S. PATENT DOCUMENTS

| | | | |
|---|---|---|---|
| 2013/0263955 A1* | 10/2013 | Hirota | F16K 11/10 137/636 |
| 2014/0103238 A1* | 4/2014 | Lv | F16K 3/246 251/129.11 |
| 2018/0135903 A1* | 5/2018 | Wiechard | F25B 41/34 |

(Continued)

FOREIGN PATENT DOCUMENTS

| | | | | |
|---|---|---|---|---|
| DE | 102016013492 A1 | | 5/2018 | |
| EP | 3816492 A1 | * | 5/2021 | ............... F16K 1/52 |
| KR | 20140098228 A | * | 10/2014 | |

OTHER PUBLICATIONS

Surround, Definition & Meaning—Merriam-Webster, https://www.merriam-webster.com/dictionary/surround (Year: 2023).*

(Continued)

*Primary Examiner* — Elizabeth J Martin
(74) *Attorney, Agent, or Firm* — Shumaker, Loop & Kendrick, LLP; James D. Miller

(57) ABSTRACT

A device for controlling a flow rate and expanding a refrigerant in a refrigerant circuit of an air conditioning system of a motor vehicle. The device has a housing, an actuating element and a valve element arranged in the interior of the housing and aligned in an axial direction, a valve seat element, and at least one sealing element. The valve element is arranged within the valve seat element and sealed towards the housing and the valve seat element via the at least one sealing element, and is formed in a circular cylindrical shape with a sealing area formed on a lateral surface. The inner surface of the sealing element forms a sealing seat in conjunction with the sealing area of the valve element.

13 Claims, 2 Drawing Sheets

(56) References Cited

U.S. PATENT DOCUMENTS

Figure 1A:
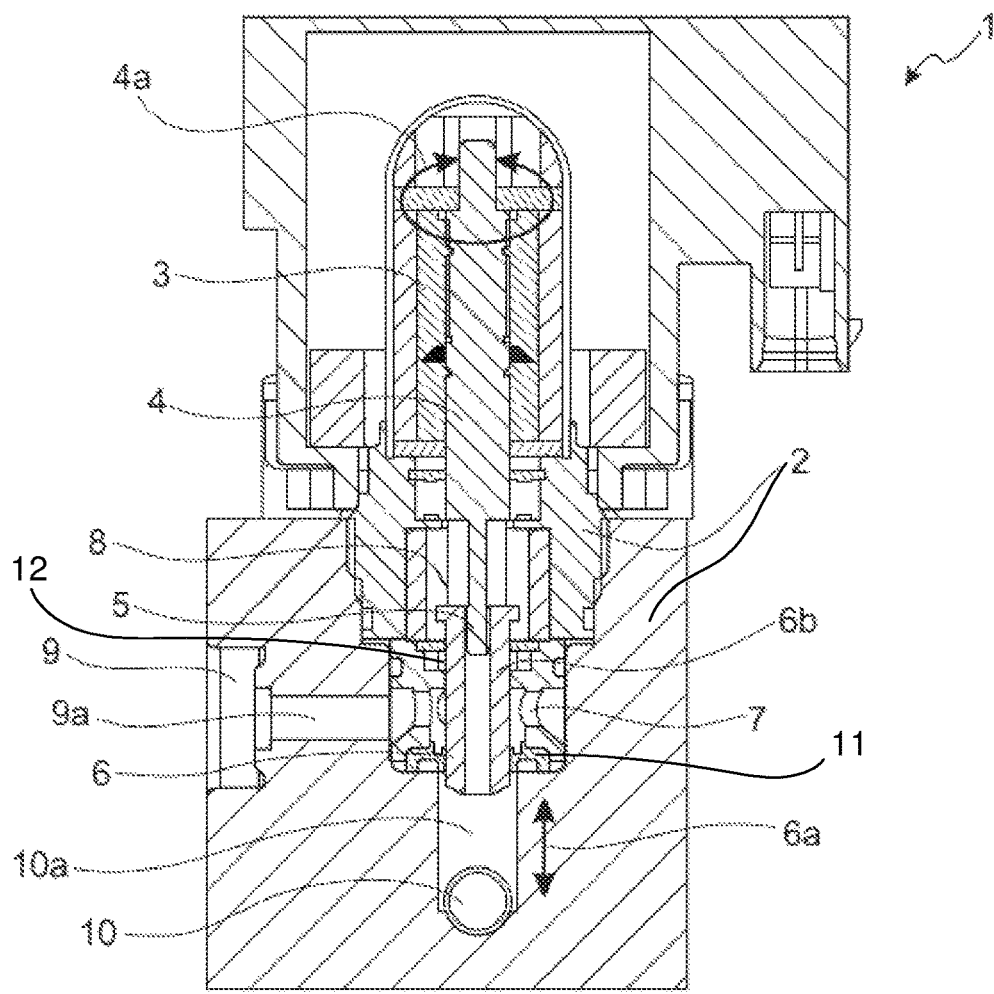

2019/0376473 A1\* 12/2019 Makino ................ F16K 31/04

OTHER PUBLICATIONS

Free, Definition & Meaning—Merriam-Webster, https://www.merriam-webster.com/dictionary/free (Year: 2023).\*
Hydraulic and Pneumatic Technology, Meng Zhuo, pp. 114-115, Shanghai Scientific and Technical Publishers, January 20197 pages, Jan. 31, 2019.

\* cited by examiner

DEVICE FOR CONTROLLING A FLOW RATE AND EXPANDING A FLUID IN A FLUID CIRCUIT

CROSS-REFERENCE TO RELATED PATENT APPLICATIONS

This patent application claims priority to German Patent Application Serial No. DE 10 2020 134 622.0 filed Dec. 22, 2020, the entire disclosure of which is hereby incorporated herein by reference.

FIELD OF THE INVENTION

The invention relates to a device for controlling a flow rate and expanding a fluid in a fluid circuit, in particular a refrigerant in a refrigerant circuit of an air conditioning system of a motor vehicle. The device has a housing and an actuating element and a valve element arranged in the interior of the housing and aligned in an axial direction, a valve seat element and at least one sealing element.

A valve as a device for controlling a flow rate and expanding a refrigerant, in particular an expansion valve, fulfills the functions of sealing, controlling a mass flow or expanding the refrigerant according to a characteristic curve, as well as allowing passthrough at full load with the flow cross-section open to the maximum. The operation with the valve's flow cross-section open to the maximum enables the refrigerant to flow through with minimal or no significant pressure loss.

In addition to the functions mentioned, the valve should also meet other criteria. Among other things, the transition between the sealing and controlling or expanding functions should be as continuous as possible and thus without a jump within the corresponding characteristic curve. Sealing must also be ensured when an electric motor-driven valve is in a de-energized state. The valve should consequently be formed to be self-sealing or self-locking.

BACKGROUND OF THE INVENTION

The use of a valve in conventional air conditioning systems, in particular in motor vehicles, with a refrigerant circuit with carbon dioxide as the refrigerant often requires a bidirectional flow through at least some components, since the direction of flow of the refrigerant within the refrigerant circuit, for example between the operating modes refrigeration system operation and heat pump operation, also referred to as heating operation, is reversed. Here, the valve operated as an expansion element is also flowed through in two directions.

Thus, the valve also has to fulfill the function of sealing in both directions of flow in order to circulate the refrigerant as a fluid in the respectively active refrigerant circuit and to prevent a shift of portions of the refrigerant in blocked sub-lines or blocked flow paths of the refrigerant circuit, which consequently are not available for the operation of the refrigerant circuit.

Expansion valves known from the prior art are also not designed in such a way to enable the function of the expansion of the fluid in two oppositely aligned directions of flow, especially with a pressure gradient on both sides with a pressure differential of up to 100 bar and the use in a temperature range of −40° C. to +120° C., especially up to +160° C.

DE 10 2016 013 492 A1 discloses an electrically driven expansion valve and shut-off valve for operation with the refrigerant R744. The valve has a valve body arranged in a valve body chamber as well as a sealing seat and a seal which are aligned along an axial direction of movement of the valve body within the valve. The valve is formed in such a way that, in a closed state, there is a pressure bypass to the valve body chamber.

Conventional valves operated as expansion members, in particular electrically driven expansion valves and shut-off valves, either do not have the required tightness or no expansion function or no flow cross-section with a maximum flow diameter for a fluid flowing through bidirectionally at high pressure and temperature levels. Valves operated as expansion members known from the prior art rather have an internal leak in the area of the valve body, also referred to as valve element, and jam when attempting to open from a closed position. In this case, the valve elements are stuck, in particular after cooling, for example to ambient temperature, in particular in a valve seat element for guiding the valve element, which impairs or even prevents opening the flow cross-section.

SUMMARY OF THE INVENTION

It is the object of the invention to provide and improve a device for controlling a flow rate and expanding a fluid in a fluid circuit, in particular in a refrigerant circuit, especially an air conditioning system of a motor vehicle, which meets the above-mentioned requirements. Here, in particular, the design of the device with regard to the functions of internal tightness, expansion or completely open flow cross-section for the fluid to flow through with minimal pressure loss is to be improved in each case with bidirectional application of the fluid. The production of the device should be simple and thus production costs should be minimal. It should be possible to operate the device reliably in every application, that is to say in a large temperature range and pressure range.

The object is achieved by the subject matter with the features as disclosed herein.

The object is achieved by a device for controlling a flow rate and expanding a fluid in a fluid circuit, in particular a refrigerant in a refrigerant circuit. The device has a housing and an actuating element and a valve element arranged in the interior of the housing and aligned in an axial direction, a valve seat element and at least one sealing element.

The valve element is arranged sealed towards the housing as well as the valve seat element, specifically for guiding and supporting, within the valve seat element and via the at least one sealing element, in particular formed as a valve seat seal, and has a substantially circular cylindrical shape with a sealing area formed on a lateral surface. The valve seat element allows the movement, preferably a linear movement, of the valve element in the axial direction.

The at least one sealing element is configured in the form of a circular ring disk, in particular with an inner diameter, an outer diameter and a longitudinal extension in the axial direction, with an inner surface formed on the inner diameter as well as a first side face and a second side face pointing in the axial direction.

According to the conception of the invention, the inner surface of the at least one sealing element in conjunction with the sealing area of the valve element forms a sealing seat.

A particular advantage of the invention is that the at least one sealing element has a groove-shaped recess on the first side face oriented in the direction of the valve seat element, which recess extends from the first side face in the axial direction into the at least one sealing element, and the sealing element is formed circumferentially in the circumferential direction.

According to a further development of the invention, the at least one sealing element is formed with a sealing edge arranged circumferentially on the first side face and on the inner diameter for abutting on the sealing area of the valve element. Here the sealing edge preferably has the shape of a web formed between the inner surface and the recess of the sealing element and which web is elastically deformable, in particular in the radial direction. In particular, the sealing edge delimits the recess of the sealing element on the inside in the radial direction.

According to a preferred configuration of the invention, the at least one sealing element has a circumferential edge circumferentially projecting from the first side face for abutting on the valve seat element. The circumferential edge delimits the recess of the sealing element on the outside in the radial direction. Here, the at least one sealing element abuts on the valve seat element with an outer side of the circumferential edge pointing in the radial direction and the area of the first side face adjoining from the circumferential edge outward in the radial direction.

According to an advantageous embodiment of the invention, the valve element, in a closed state of the device, abuts on the sealing element with the sealing area, while the valve element, in an open state of the device, is arranged forming a full-circumferential gap between the valve element and the at least one sealing element.

Another advantage of the invention is that the valve element is arranged sealed towards the housing as well as the valve seat element via at least two sealing elements. Here, the valve element is arranged sealed towards the housing as well as the valve seat element via a first sealing element and towards the housing via a second sealing element.

In a closed state of the device, the valve element with the sealing area abuts preferably on the first sealing element as well as on the second sealing element, while the valve element, in an open state of the device, is arranged with the sealing area abutting on the second sealing element and at a distance from the first sealing element. The second sealing element is preferably formed as a sliding seal.

According to a further development of the invention, the actuating element is formed as a drive shaft oriented in the axial direction. The drive shaft is preferably connected to an electric motor, in particular a stepping motor or a servomotor, which can set the drive shaft rotating about the longitudinal axis. One advantage of the invention is that the drive shaft is fixed in the axial direction within the housing.

The drive shaft, a transmission arrangement and a sliding anti-rotation lock arrangement of the device are advantageously designed to transmit the rotary movement of the drive shaft about the longitudinal axis into a linear movement of the valve element in the direction of the longitudinal axis relative to the housing.

The transmission arrangement can be formed as a pair of threads between the drive shaft, in particular an end section of the drive shaft, and the valve element. In this case, the drive shaft, specifically the end section of the drive shaft, is advantageously arranged inserting into a hole of the valve element which formed as a through hole in the direction of the longitudinal axis. The end section of the drive shaft is preferably arranged distally to an end of the drive shaft connected to the electric motor. With the hole designed as a through hole, the valve element consequently has substantially the shape of a hollow cylinder.

The pair of threads is preferably formed such that an external thread is provided on an outer side of the drive shaft and an internal thread is provided within the hole of the valve element. The external thread and the internal thread can each be formed full-circumferentially.

The transmission arrangement can have a free cross section between the drive shaft and the valve element.

Another advantage of the invention is that the housing is formed with connections for connecting to fluid lines, which are each connected to the interior of the housing via a through hole. In this case, axes of symmetry of the through holes of the connections of the housing have a common point of intersection in which the valve element is arranged.

The through hole of the first connection of the housing is preferably oriented in a radial direction relative to the longitudinal axis, while the through hole of the second connection of the housing is arranged on an opposite side of the actuating element relative to the valve element. In addition, the axis of symmetry of the through hole of the second connection of the housing and the longitudinal axis or the axis of rotation of the valve element can be oriented coaxially to one another.

The advantageous configuration of the invention enables the device to be used for controlling a flow rate and for expanding a fluid in a refrigerant circuit of an air conditioning system of a motor vehicle.

The refrigerant circuit in which the device according to the invention is used can be operated with any refrigerant, in particular R1234yf, R1234a, R134a, R744, R404a, R600 or R600a, R290, R152a, R32, as well as mixtures thereof.

The device according to the invention for controlling a flow rate and expanding a fluid in a fluid circuit, in particular as an electrically driven, springless needle valve, especially expansion valve and shut-off valve, has, in summary, further various advantages:

capable of both directions of flow with provision of the functions of expanding, blocking and allowing pass-through of the fluid with maximum opening of the flow cross-section without pressure loss with fluid flowing through it in a direction-independent manner even at high pressure level and temperature level of the fluid, including complete internal sealing with fluid flowing through it in a direction-independent manner, in particular by compensating for deviating geometrical dimensions of abutting components and which internally seal the device by means of an elastically deformable or flexible sealing seat, reliable operation in a wide temperature range and pressure range, in particular opening independent of ambient conditions and system conditions by compensating for thermal expansions of the materials of the components without the use of additional elements, such as a spring element, for example, as well as simple production with minimal production costs, also due to sufficient tolerance of a sealing seat for mass production.

DRAWINGS

Further details, features and advantages of configurations of the invention emerge from the following description of an exemplary embodiment with reference to the associated drawings.

Figure 1B:
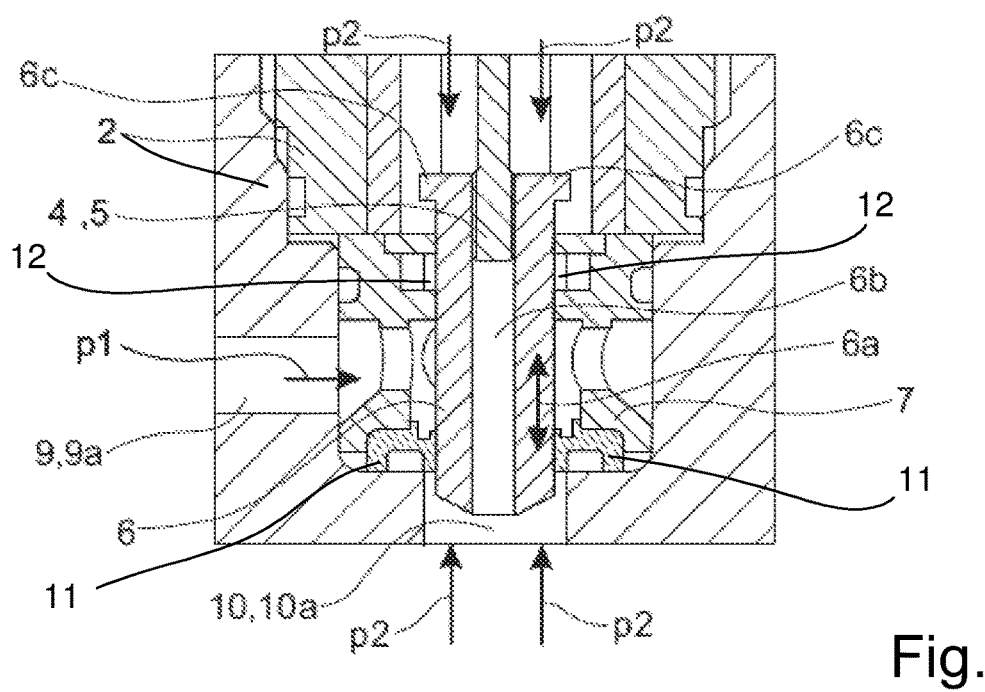
Figure 2A:
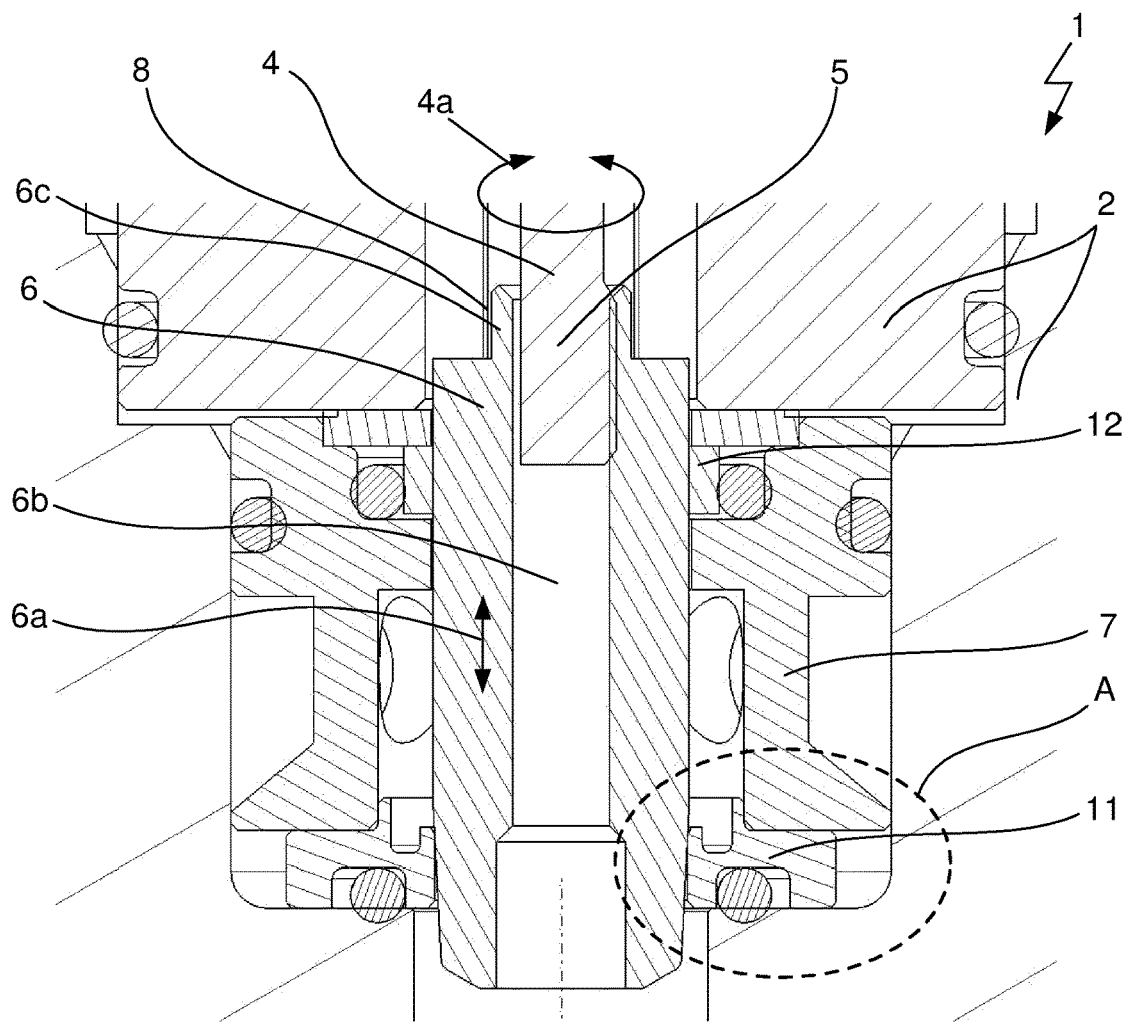
Figure 2B:
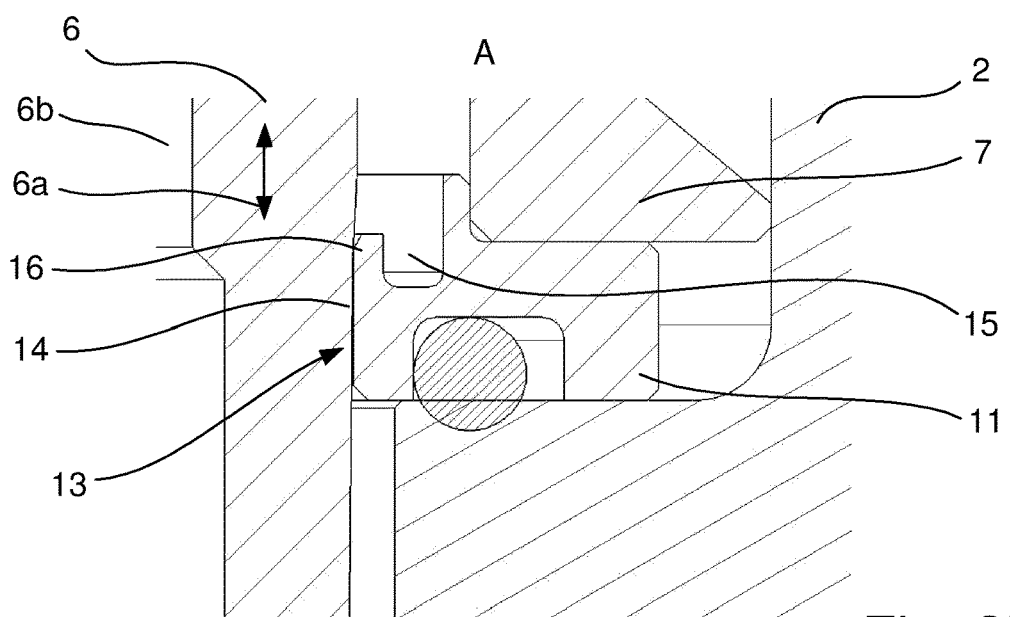

FIG. 1A: shows a device for controlling a flow rate and expanding a fluid in a fluid circuit, in particular a refrigerant circuit of an air conditioning system of a motor vehicle, with a housing and a valve element arranged within the housing in the closed state, in a lateral sectional view, FIG. 1B: shows a detail view of an arrangement of a valve element within a valve seat element and two sealing elements of the device from FIG. 1A, in a lateral sectional view, FIG. 2A: shows a detail view of the arrangement of the valve element within the valve seat element and two sealing elements of the device from FIGS. 1A and 1B, in a lateral sectional view, and FIG. 2B: shows a detail view of the arrangement of the valve element according to FIG. 2A within a first sealing element, in a lateral sectional view.

DETAILED DESCRIPTION OF EMBODIMENTS

FIG. 1A shows a device 1 for controlling a flow rate and expanding a fluid in a fluid circuit, in particular in a refrigerant circuit of an air conditioning system of a motor vehicle, with a housing 2 and a valve element 6 arranged inside the housing 2 in the closed state, in a lateral sectional view, while FIG. 1B depicts a detail view of the arrangement of the valve element 6 within a valve seat element 7 and two sealing elements 11, 12 of the device 1 according to FIG. 1A, in a lateral sectional view.

The device 1, in particular an electrically driven valve 1, is formed with an electric motor 3 which sets a drive shaft provided as an actuating element 4 in a rotary movement 4a. With the aid of a transmission arrangement 5 provided on the drive shaft 4 oriented in an axial direction, in particular a thread, specifically a so-called movement thread, the rotary movement 4a of the drive shaft 4 about its longitudinal axis is converted into a translatory stroke movement of a valve element 6, preferably formed as a valve needle. The translatory stroke movement thus corresponds to a linear movement 6a of the valve element 6 in the axial direction, that is to say in the direction of the longitudinal axis of the drive shaft 4.

The pair of threads of the transmission arrangement 5 is provided between the drive shaft 4 and the valve element 6. Here, the drive shaft 4, which substantially has the shape of a cylinder rod, in particular a round rod with sections of different diameters, is inserted with a free end into a hole 6b formed in the valve element 6. The free end of the drive shaft 4 is arranged distally to an end connected to the electric motor 3. The drive shaft 4 thus has an external thread at the free end as the first element of the pair of threads, while inside the hole 6b of the valve element 6 an internal thread is formed as the second element of the pair of threads.

The valve element 6 is arranged in a valve seat element 7. The valve element 6, which is moved linearly in the axial direction and substantially extends in the axial direction, is held here by a sliding anti-rotation lock arrangement 8, which prevents a rotary movement of the valve element 6 about the axial direction or the longitudinal axis of the valve element 6 and allows the linear movement 6a in the axial direction.

The valve element 6 has protrusions 6c in the region sliding along inside the housing 2. The protrusions 6c are formed on an end of the valve element 6 that is oriented towards the electric motor 3 and project in pairs opposite from the valve element 6. The valve element 6 thus has a T-shape in a cross section through the longitudinal axis.

The housing 2 is formed in the area of the protrusions 6c of the valve element 6 with notch-shaped or groove-like recesses arranged opposite one another with respect to the longitudinal axis of the valve element 6, each of which corresponds in shape to a protrusion 6c of the valve element 6. The shapes of the recesses of the housing 2 correspond to the outer shape of the protrusions 6c of the valve element 6 plus a play for sliding movement of the valve element 6 within the housing 2 in the axial direction.

By arranging the protrusions 6c of the cross-sectionally T-shaped valve element 6 within the notch-shaped or groove-like recesses of the housing 2, a rotary movement of the valve element 6, driven by the actuating element 4 rotating about the longitudinal axis, is prevented. The valve element 6 is thus guided in the linear movement 6a by the rotary movement 4a of the actuating element 4 without its own rotation about the longitudinal axis.

The device 1 is also formed with a first connection 9 and a second connection 10 for connecting to fluid lines. A through hole 9a of the first connection is oriented to the valve element 6 in the radial direction, while a through hole 10a of the second connection 10 is oriented in the axial direction of the valve element 6. The through hole 9a of the first connection 9 is pressurized by refrigerant at a first pressure p1, so that the pressure p1 acts on the valve element 6 substantially in the radial direction. The through hole 10a of the second connection 10 is pressurized by refrigerant at a second pressure p2, so that the pressure p2 acts on the valve element 6 substantially in the axial direction. All the pressurized surfaces of the valve element 6 are designed in such a way that the valve element 6 is arranged in an almost isostatic state. The pressure forces acting on the valve element 6 are in equilibrium.

The introduction of a section formed as a flattened area, not shown, of the thread of the actuating element 4, which otherwise has a circular cross-section, ensures the pressure equalization in the axial direction with respect to the second pressure p2 within the valve 1 as a flow through hole in combination with the hole 6b of the valve element 6 formed as a through bore.

The valve element 6 is also arranged via two sealing elements 11, 12, in particular a first, static sealing element 11, sealed towards the housing 2 as well as the valve seat element 7, and on the other hand a second, dynamic sealing element 12 sealed towards the housing 2. The second sealing element 12 is formed as a sliding seal, in particular a rod seal, in the form of an axial seal or a ring seal, while the first sealing element 11 is formed as a seat seal, in particular as a valve seat seal. The first sealing element 11 is consequently arranged between the housing 2, the valve element 6 and the valve seat element 7.

Due to the dimensioning of the electric drive, only a limited force is available for moving the valve element 6, that is to say the valve needle. In addition, a tight fit of the valve element 6 within the valve seat element 7 in the de-energized state of the electric motor 3 as well as at temperatures from −40° C. to +120° C., in particular up to +160° C., must be ensured. By generating a force acting on the valve element 6 and thus pressing the valve element 6 into the valve seat element 7, the valve element 6 can be held by the transmission arrangement 5 formed as a self-locking movement thread. However, a combination of the force pressing the valve element 6 into the valve seat element 7 with a change in temperature and the associated different expansion of the components of the valve 1 result in the components jamming, in particular the valve element 6 within the first sealing element 11, so that the valve element 6 is immovably fixed specifically when attempting to open it from a closed position.

FIG. 2A shows a detail view of an arrangement of the valve member 6 within the valve seat element 7 and two sealing elements 11, 12 of the device 1 according to FIGS.

1A and 1B, in a lateral sectional view, while FIG. 2B depicts a detail view of the arrangement of the valve element 6 according to FIG. 2A within a first sealing element 11 of the valve 1, in a lateral sectional view.

The valve element 6 and the first sealing element 11 abut on one another in a sealing area 13, causing the device 1 to be sealed internally. The first sealing element 11 is configured substantially as a circular ring disk with an inner diameter, an outer diameter and an extension in the axial direction, also referred to as the thickness or depth of the first sealing element 11. The lateral surface of the first sealing element 11, which is formed as a hollow circular cylindrical inner surface on the inner diameter, represents a sealing seat 14 in conjunction with a circular cylindrical outer surface or lateral surface of the valve element 6.

To achieve complete internal tightness of the device 1, at least in the sealing area 13, the valve element 6 must be formed with an exact circular cylindrical outer surface and the first sealing element 11 with an exact hollow circular cylindrical inner surface, which correspond to one another. The production of a circular cylindrical outer surface of the valve element 6 as well as a hollow circular cylindrical inner surface of the first sealing element 11 each with a constant radius over the circumference and the entire length of the sealing area 13 or the sealing seat 14 cannot be ensured due to possible, economically sensible production processes and machining processes.

In order to compensate for deviations in the radii of the circular cylindrical outer surface of the valve element 6 as well as of the hollow circular cylindrical inner surface of the first sealing element 11 from the constant radius over the circumference and the entire length of the sealing area 13 or the sealing seat 14, the first sealing element 11 is formed with a recess 15.

The recess 15 has the shape of a groove or a notch, which, from a first side face of the substantially circular ring disk-shaped sealing element 11 pointing in the axial direction, extends into the sealing element 11 in the axial direction, and which surrounds the first sealing element 11 radially. The first side face is oriented in the direction of the valve seat element 7.

The sealing element 11 is provided with a further recess on a second side face opposite the first side in the axial direction, which recess extends in the form of a groove into the sealing element 11 in the axial direction and surrounds the first sealing element 11 radially. The second side face is oriented in the direction of the housing 2.

A surrounding edge of the recess 15 arranged on the outside in the radial direction projects from the first side face of the first sealing element 11 pointing in the axial direction so that the first sealing element 11 abuts on the valve seat element 7. The first sealing element 11 abuts on the valve seat element 7 with an outer side pointing in the radial direction of the surrounding edge of the recess 15 arranged on the outside, as well as the area of the first side face of the first sealing element 11 that adjoins from the surrounding edge arranged on the outside in the radial direction to the outside.

A surrounding edge of the recess 15 arranged on the inside in the radial direction is formed as a flexible sealing edge 16 for abutment of the first sealing element 11 on the valve element 6. The sealing edge 16 has the shape of a web provided between the hollow circular cylindrical inner surface and the recess 15 of the first sealing element 11, which web is elastically deformable, in particular in the radial direction.

With the elastic deformability of the sealing edge 16 of the first sealing element 11, the sealing seat 14 can be molded onto the circular cylindrical outer surface of the valve element 6. The recess 15 consequently enables an elastic movement of the sealing edge 16 and thus an adaptation of the sealing seat 14 of the first sealing element 11 to the sealing area 13 of the valve element 6, so that the contour of the outer surface of the valve element 6 always abuts on the first sealing element 11, internally sealing the device 1. The adaptation of the sealing surfaces in the sealing area 13 of the valve element 6 or the sealing seat 14 of the first sealing element 11 enables an internally tightly closing valve 1.

The sealing seat 14 formed in this way with the flexibly deformable sealing edge 16 of the first sealing element 11 serves not only to compensate for geometric deviations in the sealing surfaces but also to compensate for different thermal expansions of the materials of the components of the device 1, in particular the housing 2, the valve element 6 and the valve seat element 7 and the first sealing element 11, without the use of additional elements, such as a spring element.

The different thermal expansions of the materials of the housing 2, the valve element 6 and the valve seat element 7 as well as the first sealing element 11 have a very clear effect, for example, when the device 1 is closed after operation. In this case, the components can be heated to temperatures in the range up to 160° C.

After a standstill or a resting phase of the system, the components of the device 1 can have cooled down to an ambient temperature of approximately 25° C. In this case, the first sealing element 11 at the sealing seat 14 in the sealing area 13 can be shrunk onto the valve element 6 so that the device 1 cannot be opened at the next system start.

With the formation of the first sealing element 11 with the flexible sealing seat 14, the rigid shrinking of the sealing element 11 onto the valve element 6 is avoided, since the flexibly deformable sealing edge 16 compensates for the different thermal expansion of the materials. The valve 1 remains fully functional under all circumstances.

LIST OF REFERENCE NUMERALS 1 device, valve
2 housing
3 electric motor
4 actuating element, drive shaft
4a rotary movement of actuating element 4
5 transmission arrangement
6 valve element
6a linear movement of valve element 6
6b hole of valve element 6
6c protrusion of valve element 6
7 valve seat element
8 sliding anti-rotation lock arrangement
9 first connection
9a through hole of the first connection 9
10 second connection
10a through hole of the second connection 10
11 first sealing element
12 second sealing element
13 sealing area
14 sealing seat
15 recess
16 sealing edge
p1, p2 pressure

What is claimed is:

1. A device for controlling a flow rate and expanding a fluid in a fluid circuit, the device comprising:
   a housing;
   an actuating element and a valve element arranged in an interior of the housing and aligned in an axial direction, wherein the valve element is substantially circular cylindrically shaped and includes a sealing area formed on a lateral surface thereof;
   a valve seat element disposed within the interior of the housing, the valve seat element including an opening formed therethrough having the valve element received therein, wherein the opening of the valve seat element guides movement of the valve element in the axial direction; and
   a first sealing element, wherein the valve element is sealed towards the housing as well as the valve seat element via the first sealing element, wherein the first sealing element is shaped as a circular ring disk with an inner surface formed on an inner diameter, a first side face facing in the axial direction towards the valve seat element, and a second side face facing in the axial direction away from the valve seat element, and wherein the inner surface of the first sealing element forms a sealing seat in conjunction with the sealing area of the valve element when the valve element is received within the inner surface of the first sealing element during movement of the valve element in the axial direction, wherein the first sealing element has a recess formed in the first side face thereof with the recess extending circumferentially to surround the inner surface of the first sealing element, wherein the recess extends from the first side face in the axial direction into the first sealing element towards the second side face thereof.

2. The device according to claim 1, wherein the first sealing element is formed with an annular sealing projection projecting axially from the first side face along the inner diameter of the first sealing element, the first sealing projection delimiting the recess at a radially inner side thereof, and the first sealing projection configured to abut the sealing area of the valve element when the valve element is received within the inner surface of the first sealing element.

3. The device according to claim 2, wherein the sealing projection is shaped as a web formed between the inner surface and the recess of the first sealing element, and wherein the web is elastically deformable.

4. The device according to claim 3, wherein the sealing element has a surrounding projection projecting axially from the first side face for abutting on the valve seat element, and wherein the surrounding projection delimits the recess on an outside in a radial direction.

5. The device according to claim 1, wherein the valve element is arranged, in a closed state of the device, with the sealing area abutting on the first sealing element, and that the valve element, in an open state of the device, is arranged forming a full-circumferential gap between the valve element and the first sealing element.

6. The device according to claim 1, further comprising a second sealing element, wherein the valve element is arranged sealed towards the housing via the second sealing element.

7. The device according to claim 6, wherein the valve element, in a closed state of the device, is arranged with the sealing area abutting on the first sealing element and on the second sealing element, and that the valve element, in an open state of the device, is arranged with the sealing area abutting on the second sealing element and at a distance from the first sealing element.

8. The device according to claim 6, wherein the second sealing element is formed as a sliding seal.

9. The device according to claim 1, wherein the actuating element is formed as a drive shaft oriented in the axial direction.

10. The device according to claim 9, wherein the drive shaft is formed connected to an electric motor.

11. The device according to claim 9, wherein the drive shaft as well as a transmission arrangement and a sliding anti-rotation lock arrangement are formed for transmitting a rotary movement of the drive shaft about a longitudinal axis into a linear movement of the valve element in the direction of the longitudinal axis relative to the housing.

12. The device according to claim 11, wherein the transmission arrangement is formed as a pair of threads between the drive shaft and the valve element, wherein the drive shaft is arranged inserting into a hole of the valve element formed as a through-hole.

13. The device according to claim 12, wherein the transmission arrangement is formed with an open space present between the drive shaft and the valve element.

* * * * *